US008776284B2

(12) United States Patent  
Jones

(10) Patent No.: US 8,776,284 B2  
(45) Date of Patent: Jul. 15, 2014

(54) MOVEABLE BED SYSTEM

(75) Inventor: Thomas G. Jones, Riverside, CA (US)

(73) Assignee: Allied Recreation Group, Inc., Decatur, IN (US)

(*) Notice: Subject to any disclaimer, the term of this patent is extended or adjusted under 35 U.S.C. 154(b) by 580 days.

(21) Appl. No.: 12/951,416

(22) Filed: Nov. 22, 2010

(65) Prior Publication Data

US 2012/0124738 A1 May 24, 2012

(51) Int. Cl.
*A47C 17/00* (2006.01)
*A47D 7/04* (2006.01)
*A47C 17/80* (2006.01)
*B60P 3/39* (2006.01)

(52) U.S. Cl.
CPC .. *B60P 3/39* (2013.01); *A47C 17/80* (2013.01)
USPC .............................. 5/10.2; 5/11; 5/118; 5/611

(58) Field of Classification Search
CPC ...... A47C 17/84; A47C 19/045; B63B 29/10; A61G 7/012
USPC ........................................ 5/10.2, 11, 118, 611
See application file for complete search history.

(56) References Cited

U.S. PATENT DOCUMENTS

| 20,622 | A | | 6/1858 | Case |
| 145,113 | A | | 12/1873 | Lindner |
| 1,493,104 | A | * | 5/1924 | Carrigan ........................... 5/112 |
| 1,722,916 | A | | 7/1929 | Heumader |
| 1,743,863 | A | * | 1/1930 | Northrop et al. ............... 248/439 |
| 2,094,553 | A | * | 9/1937 | Shaw ................................. 5/11 |
| 2,113,558 | A | | 4/1938 | Wren |
| 2,156,229 | A | | 4/1939 | Ragsdale et al. |
| 2,206,248 | A | * | 7/1940 | Bukolt .............................. 5/11 |
| 2,481,965 | A | * | 9/1949 | Woller ............................... 5/11 |
| 2,556,140 | A | | 6/1951 | Lyon |
| 2,592,924 | A | * | 4/1952 | Lyon ............................ 105/318 |
| 2,654,895 | A | * | 10/1953 | Stevens ............................ 5/9.1 |
| 3,588,168 | A | | 6/1971 | Froltzheim et al. |
| 3,638,247 | A | * | 2/1972 | Kennedy ............................ 5/11 |
| 3,772,716 | A | | 11/1973 | Ratcliff |
| 4,005,898 | A | | 2/1977 | Way |
| 4,084,276 | A | * | 4/1978 | Trexler et al. .................... 5/118 |
| 4,231,297 | A | | 11/1980 | Holbek |

(Continued)

FOREIGN PATENT DOCUMENTS

EP 0104459 B1 7/1986
FR 2532167 A1 3/1984

OTHER PUBLICATIONS

Jayco, Inc., Recreational Vehicle Bed Photos, 2007, 8 photos.
Unknown, Recreational Vehicle Bed Photo, undated, 1 photo.

*Primary Examiner* — Robert G Santos
*Assistant Examiner* — David E Sosnowski
(74) *Attorney, Agent, or Firm* — Barnes & Thornburg

(57) ABSTRACT

A bed moveable from a lowered position to a raised position includes two pairs of guides. In each pair, one guide is oriented so as to be substantially vertical and the other guide is disposed at an angle to the first guide. A lift assembly is located in each guide. A support including a frame is coupled to the lift assemblies. A drive system moves the lift assemblies in two directions, thereby lowering and raising the support. As the support is raised, it moves from a substantially horizontal orientation to a non-horizontal orientation.

16 Claims, 6 Drawing Sheets

(56) References Cited

U.S. PATENT DOCUMENTS

| | | |
|---|---|---|
| 4,462,127 A | 7/1984 | Schmidt et al. |
| 4,498,418 A | 2/1985 | Chumley |
| 4,790,611 A | 12/1988 | Craner |
| 4,837,877 A * | 6/1989 | Hamada et al. .................. 5/10.2 |
| 5,461,735 A * | 10/1995 | Danton ............................ 5/10.2 |
| 5,638,559 A * | 6/1997 | Natri et al. ...................... 5/10.2 |
| 5,638,560 A * | 6/1997 | Rigdon et al. .................... 5/118 |
| 6,231,114 B1 | 5/2001 | Warmoth |
| 6,557,190 B2 * | 5/2003 | Bailey ............................... 5/118 |
| 6,988,760 B2 | 1/2006 | Rasmussen |
| 7,039,968 B1 | 5/2006 | Warmoth |
| 7,070,176 B1 | 7/2006 | Rios |
| 7,198,320 B2 * | 4/2007 | Rasmussen .................. 296/170 |
| 7,610,636 B2 * | 11/2009 | Holmes et al. .................... 5/118 |
| 7,874,026 B2 * | 1/2011 | Gudenkauf ......................... 5/11 |
| 8,151,387 B2 * | 4/2012 | Osborne et al. .................. 5/618 |
| 2006/0181110 A1 * | 8/2006 | Rasmussen .................. 296/170 |
| 2007/0226901 A1 * | 10/2007 | Pervorse et al. ................... 5/118 |
| 2008/0282467 A1 * | 11/2008 | Edwards ......................... 5/10.2 |
| 2011/0030136 A1 * | 2/2011 | Kim ................................ 4/547 |

* cited by examiner

MOVEABLE BED SYSTEM

The present invention relates to a moveable bed system. In particular, the present invention relates to a bed that can be moved from a lowered, substantially horizontal position to a raised, non-horizontal position.

BACKGROUND AND SUMMARY OF THE INVENTION

Various types of moveable beds are known in the prior art. For example, U.S. Pat. No. 6,988,760 discloses a number of mechanisms for moving a bed from one position to another. Such beds are sometimes used in recreational vehicles. In this manner, the bed can be moved from a lowered or sleeping position to a raised or stored position, thereby occupying less of the recreational vehicle space typically used while the occupants are awake.

In one embodiment of the present invention, a bed system includes a support structure having a frame. Four frame members extend beyond the perimeter of the frame. A support surface is connected to the frame. The system further includes first and second vertically oriented guides located opposite each other in a first direction. Third and fourth guides are also located opposite each other in the first direction. Each of the guides has a first end and a second end. The first and third guides are located opposite each other in a second direction such that the distance between the first end of the first guide and the first end of the third guide is greater than the distance between the second end of the first guide and the second end of the third guide. The second and third guides are located opposite each other in the second direction such that the distance between the first end of the second guide and the first end of the fourth guide is greater than the distance between the second end of the second guide and the second end of the fourth guide. A first cross member has a first end connected to the second end of the first guide and a second end connected to the second end of the third guide. A second cross member has a first end connected to the second end of the second guide and a second end connected to the second end of the fourth guide. Chains are located in each of the guides and cross members. A lift assembly is located in each of the guides and coupled to the chain located in the guide. The system further includes a drive system including a motor and a transmission for imparting motion to the chains so as to move the lift assemblies upward, resulting in movement of the support structure from a first, substantially horizontal orientation to a second non-horizontal orientation. In one embodiment, the lift assemblies include at least one projecting finger that engages an opening in one of the chains. In another embodiment, the drive system further includes a drive member extending between the third and fourth guides.

In another embodiment of the invention, the system further includes first and second links. The first link has a first end pivotally coupled to the one lift assemblies and a second end pivotally coupled to the one of the frame members. The second link has a first end pivotally coupled to another one of the lift assemblies and a second end pivotally coupled to another one of the frame members. The system can further include a stop member that is engaged by one of the links when the support is in the substantially horizontal orientation.

In another embodiment of the present invention, a bed system includes a support, first, second, third and fourth guides, a lift assembly located in each of the guides and a drive system coupled to the lift assemblies for moving them in at least two directions. Each of the lift assemblies is coupled to the support. Each of the guides has a first end and a second end. The first end of the third guide is located a first distance from the first end of the first guide and the second end of the third guide is located a second distance from the second end of the first guide, the second distance being shorter than the first distance. The first end of the fourth guide is located a first distance from the first end of the second guide and the second end of the fourth guide is located a second distance from the second end of the second guide, the second distance being shorter than the first distance. The system may also include a link pivotally coupled to the support and one of the lift assemblies. The support can move from a lowered position to a raised position and the system can further include a stop member that the link engages when the support is in the lowered position.

In another embodiment of the present invention, a bed system includes a support moveable from a lower substantially horizontal orientation to a raised non-horizontal orientation, a plurality of guides, a lift assembly located in each of the guides and moveable with respect to the guide and a drive system including a motor for moving the lift assemblies from a lowered position to a raised position. Each of the lift assemblies is coupled to the support. The system can include at least one link pivotally coupled to the support and pivotally coupled to one of the lift assemblies. The system can further include a stop member and the link can engage the stop member when the support is in the lower substantially horizontal orientation. In another embodiment, at least one of the lift assemblies includes a projection that engages a portion of the drive system. In another embodiment one of the guides is vertically oriented and a second guide is oriented at an angle to the first guide.

In another embodiment of the invention, a recreational vehicle includes one or more of the bed systems according to one or more embodiments of the present invention.

DETAILED DESCRIPTION OF THE PREFERRED EMBODIMENTS

Figure 1:
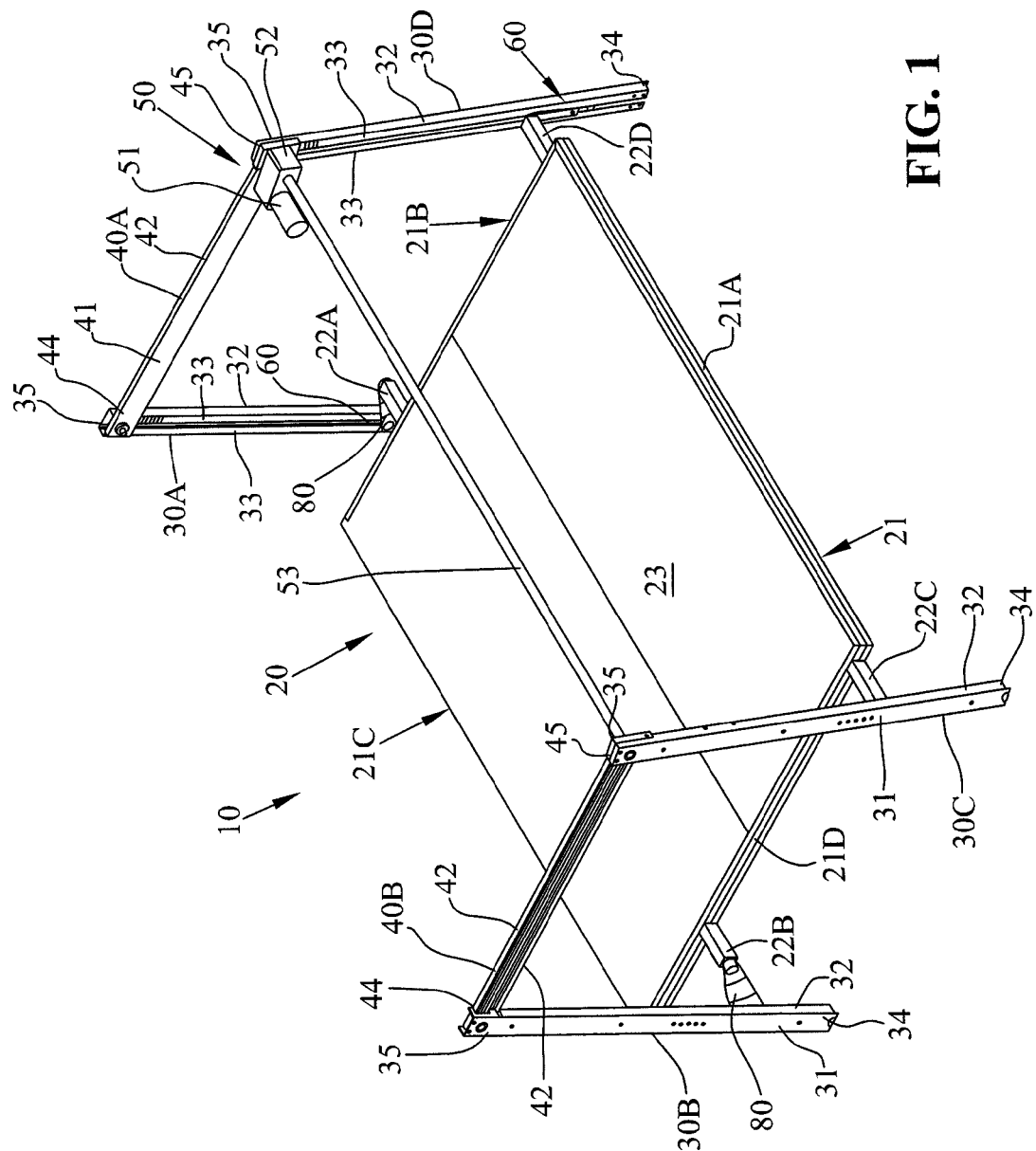
FIG. 1 is a perspective view of a moveable bed system according to one embodiment of the present invention in a lowered, substantially horizontal position.

FIG. 1 is a perspective view of a movable bed according to one embodiment of the present invention in the lowered position. Bed 10 generally includes a support 20, a track or guide system including first guide 30A, a second guide 30B, third guide 30C and fourth guide 30D, cross members 40A and 40B, drive system 50 and lift assemblies 60.

In the embodiment shown, support 20 includes a frame 21 having a plurality of frame members 21A, 21B, 21C and 21D. In this embodiment, frame members 21A, 21B, 21C and 21D are hollow, rectangular rigid members that are joined adjacent there ends by welding or other means so as to form a frame having a generally rectangular perimeter. A support surface 23 is positioned on frame 21 and secured thereto by bolts or other fastening means. Frame members 21A, 21B, 21C and 21D and support surface 23 may be made from any materials that are sufficiently strong so as to be able to support a mattress, bedding and one or more persons thereon as desired. Frame 21 further includes four frame members 22A, 22B, 23C and 23D extending in a generally horizontal direction beyond the perimeter formed by frame members 21A, 21B, 21C and 21D. Horizontally extending frame members 22A, 22B, 22C and 22D are coupled to lift assemblies 60 as explained in greater detail below.

Each of the guides 30A, 30B, 30C and 30D in the embodiment shown is a generally C-shaped channel having first portion 31, a pair of flanges 32 extending substantially perpendicular to first portion 31 and a pair of flanges 33 extending toward each other and substantially perpendicularly from flanges 32 and substantially parallel to first portion 31. Each guide 30A, 30B, 30C and 30D also includes a first end 34 and a second end 35. Note that guides 30A and 30B are oriented in a substantially vertical direction, whereas guides 30C and 30D are placed at an angle with respect to guides 30A and 30B such that the distance between ends 35 of guides 30A and 30D is less than the distance between ends 34 of guides 30A and 30D. Similarly, the distance between ends 35 of guides 30B and 30C is less than the distance between ends 34 of guides 30B and 30C. Guides 30A, 30B, 30C and 30D accommodate certain components of the drive system 50 and lift assemblies 60 as described in greater detail below.

In the embodiment shown, cross members 40A and 40B are generally U-shaped channels having first portion 41 and a pair of flanges 42 extending substantially perpendicular to first portion 41. Cross member 40A is secured at one end 44 to end 35 of guide 30A and at the other end 45 to end 35 of guide 30D. Similarly, cross member 40B is secured at one end 44 to end 35 of guide 30B and at the other end 45 to end 35 of guide 30C.

Figure 3:
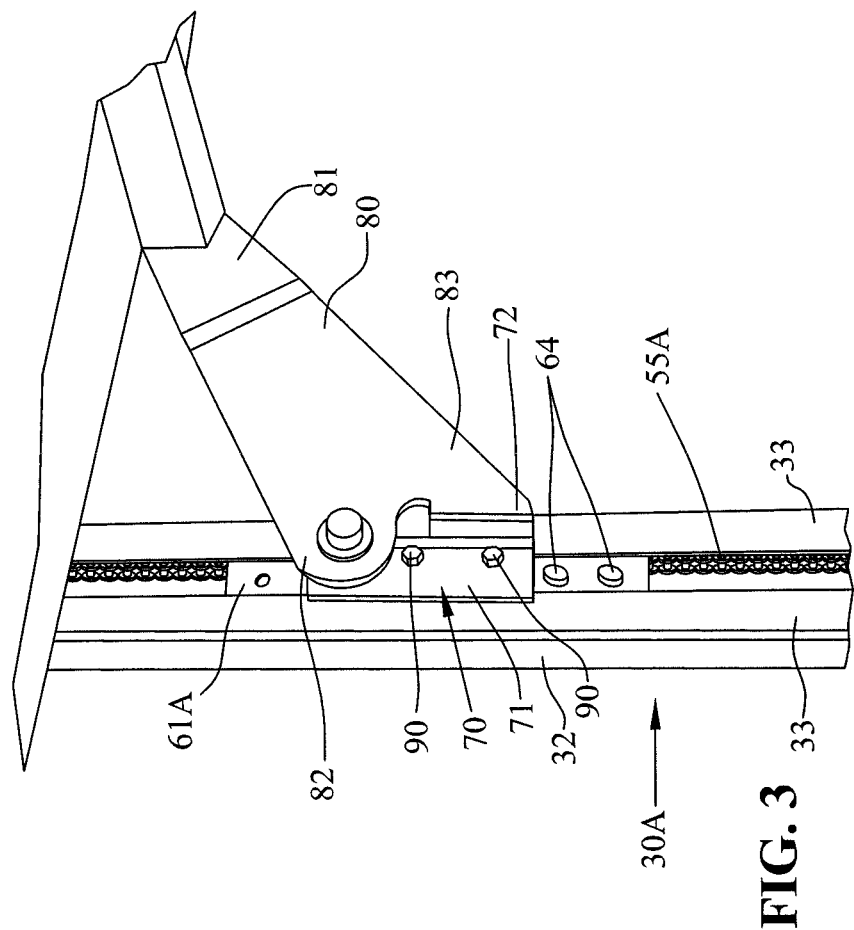
FIG. 3 is a detailed perspective view of a portion of the bed system of FIG. 1 in the lowered, substantially horizontal position.
Figure 4:
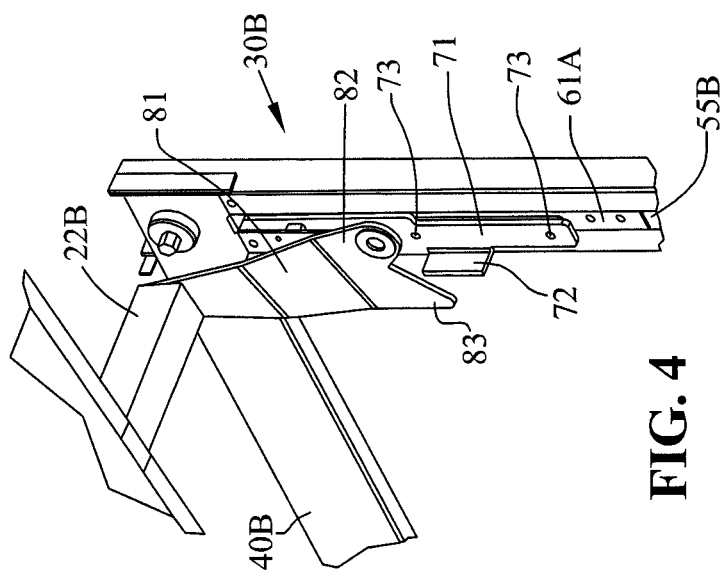
FIG. 4 is a detailed perspective view of a portion of the bed system of FIG. 1 in the raised, non-horizontal position.

In the embodiment shown, drive system 50 generally includes an electric motor 51, a housing 52, a drive member 53, chains 54A and 54B located in frame members 40A and 40B, respectively, and chains 55A, 55B, 55C and 55D located in guides 30A, 30B, 30C and 30D, respectively. FIGS. 3 and 4 illustrate the manner in which the various chains are located in the guides and cross members with reference to guide 30A and 30B and chains 55A and 55B. Drive system 50 further includes a transmission (not shown) located within housing 52 and one or more gears (not shown) located in cross members 40A and 40B and/or guides 30A, 30B, 30C and 30D in the area where cross members 40A and 40B are connected to guides 30A, 30B, 30C and 30D. Upon activation of electric motor 51, the transmission imparts motion to the gears to cause movement of chain 55D located in guide 30D and chain 54A located in cross member 40A. Chain 54A in turn imparts motion to chain 55A located in guide 30A through the gears located adjacent the ends of guide 30A and cross member 40A. The transmission also imparts rotational movement to drive member 53, which imparts motion through the gears associated with one end of cross member 40B and guide 30C to chain 54B in cross member 40B and chain 55C in guide 30C. Chain 54B imparts motion to the gears associated with the other end of cross member 40B and guide 30B, thereby imparting motion to chain 55B located in guide 30B. Several such drive systems are known in the art. One example of such a drive system is shown in U.S. Pat. No. 6,988,760.

Figure 5:
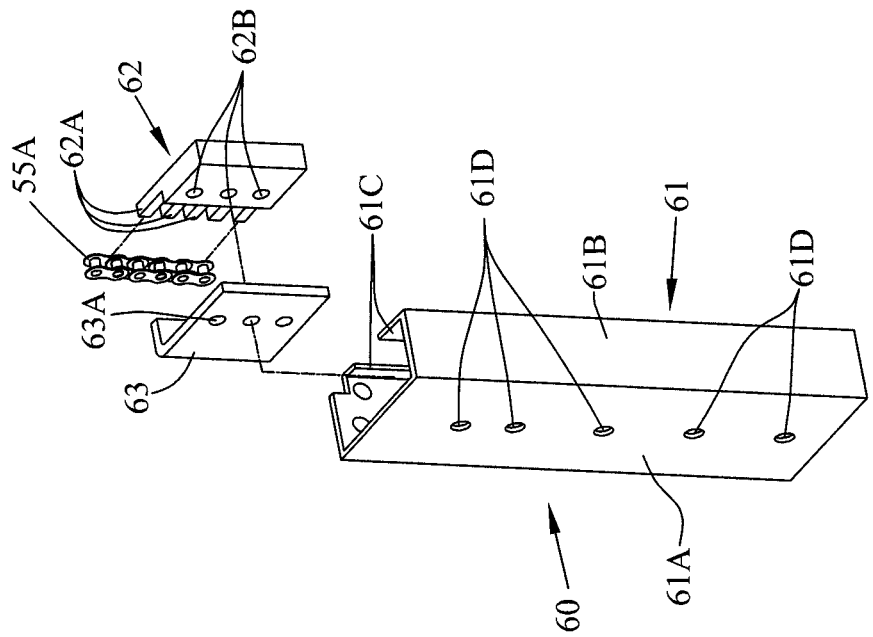
FIG. 5 is an exploded perspective view of one embodiment of a lift assembly that is a component of the bed system of FIG. 1.

Turning to FIGS. 3-5, each lift assembly 60 includes a first member 61, a drive member 62 and a bracket 63. In the embodiment shown, members 61 are generally C-shaped channels having a first section 61A, a pair of flanges 61B extending generally perpendicularly from first section 61A and a pair of flanges 61C extending generally perpendicularly from flanges 61B and generally parallel to first section 61A. Member 61 also includes a plurality of holes or openings 61D. Drive member 62 in the embodiment shown includes a plurality of projections or fingers 62A and a plurality of holes or openings 62B. Bracket 63 is generally L-shaped and includes a plurality of holes or openings 63A. Drive members 62 and bracket 63 are secured within member 61 by inserting one or more screws or other fasteners 64 through one or more of the holes 61D, 62B and 63A. Each lift assembly 60 is positioned in one of the guides 30A, 30B, 30C and 30D such that fingers 62A of drive members 62 engage the openings in the corresponding chain 55A, 55B, 55C and 55D.

The lift assemblies 60 located in guides 30A and 30B are coupled to one end of frame 21 by brackets 70 and links 80. Each bracket 70 includes a first portion 71, a projecting stop member 72 and a plurality of openings 73. In the embodiment shown, stop member 72 extends generally perpendicularly from first portion 71. Each link 80 generally includes a first end 81 pivotally connected to horizontally extending frame member 22A or 22B and a second end 82 pivotally connected to portion 71 of a bracket 70. Link 80 further includes a projection 83 adjacent one end thereof. As shown in FIG. 3, lift assemblies 60 are coupled to frame 21 by inserting screws or other fasteners 90 through one or more openings 73 and one or more openings 61D.

Figure 6:
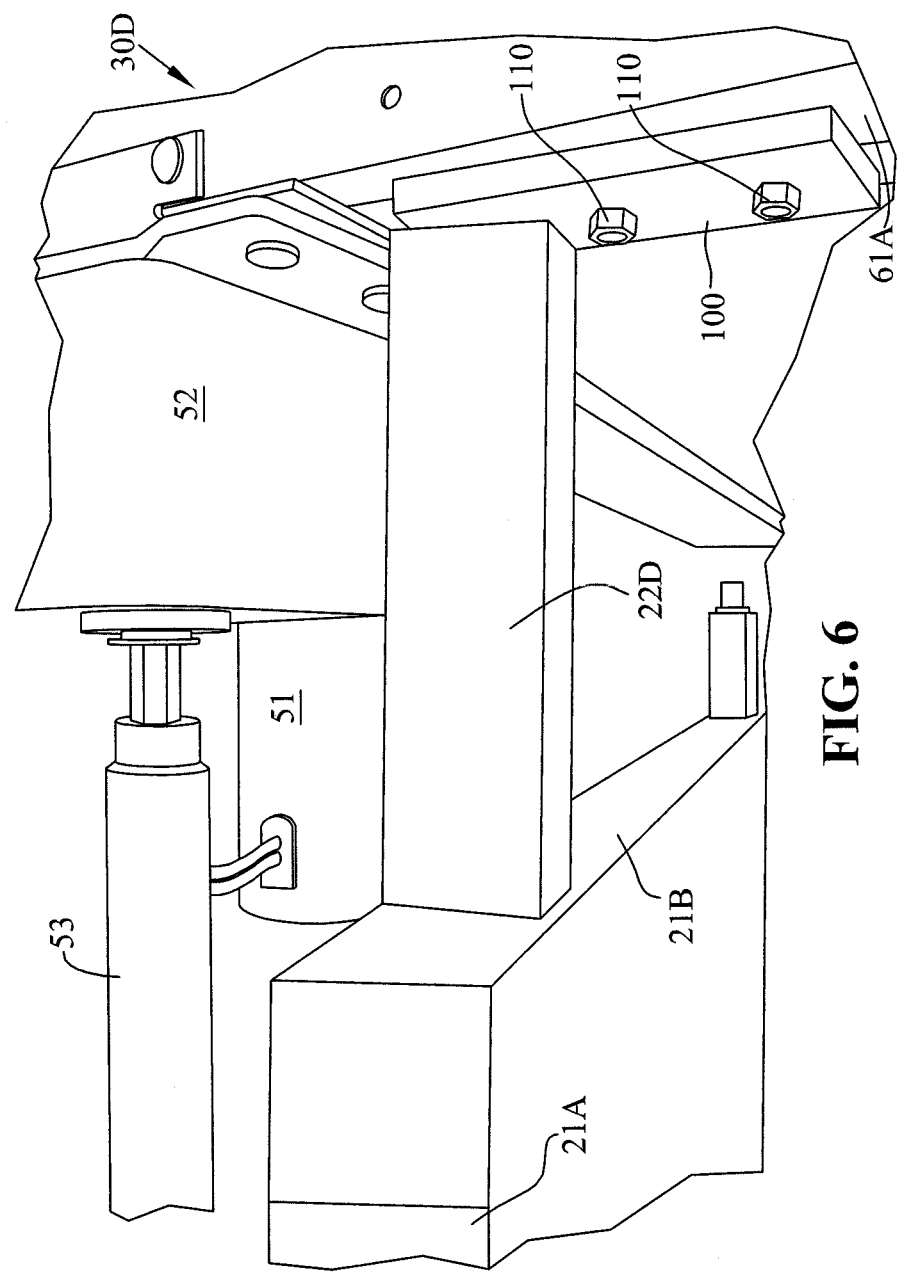
FIG. 6 is a perspective view of a detail of a portion of the bed system of FIG. 1 in the raised, non-horizontal position.

Turning to FIG. 6, the lift assemblies 60 located in guides 30C and 30D are coupled to the other end of frame 21 by brackets 100. Each bracket 100 includes a plurality of openings through which screws or other fasteners 110 are inserted and into openings 61D in one of the lift assemblies 60 to secure brackets 100 to the lift assemblies. The lift assemblies 60 located in guides 30C and 30D are coupled to frame 21 by connecting brackets 100 to horizontally extending frame members 22C and 22D. Brackets 100 may be connected to horizontally extending frame members 22C and 22D in any one of a number of manners, such as by using cap screws or other fastener means that provide for a pivotal connection.

Figure 2:
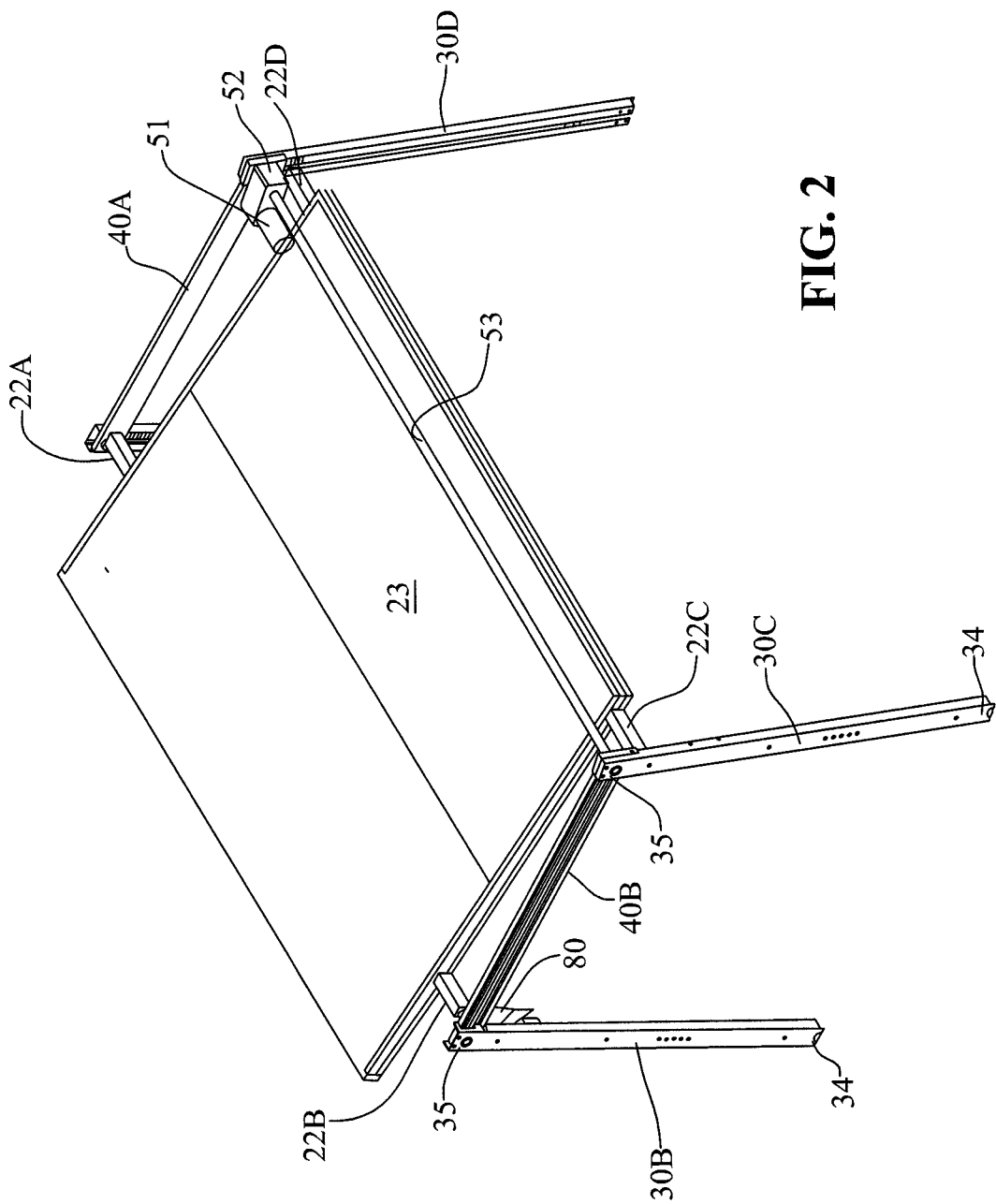
FIG. 2 is a perspective view of the moveable bed system of FIG. 1 in a raised, non-horizontal position.

To raise support structure 20 from the lower position shown in FIG. 1 to the raised position shown in FIG. 2, motor 51 is actuated in a first direction, thereby causing chains 55A, 55B, 55C and 55D to move in a first direction through the mechanism described above. As chains 55A, 55B, 55C and 55D move in the first direction, drive members 62 move upwardly because of the engagement of fingers 62A with the openings in the chains. As drive members 62 move upwardly, they carry with them the remaining components of lift assemblies 60 and their associated brackets 70 and 100. Because the distance between second ends 35 of guides 30A and 30D and second ends 35 of guides 30B and 30C is less than the distance between first ends 34 of guides 30A and 30D first ends 34 of guides 30B and 30C, horizontally extending frame members 22C and 22D move toward guides 30A and 30B as support 20 rises. As this occurs, links 80 pivot about their connections between horizontal frame members 22B and 22A and their respective brackets 70 from the generally horizontal position shown in FIG. 1 to a more vertical orientation as shown in FIGS. 2 and 4. This causes the end of support structure 20 adjacent guides 30A and 30B to move upwardly at a faster rate than the end of support structure 20 located adjacent guides 30C and 30D and to be located at a vertically higher location than the opposite end of support structure 20.

That is, support structure 20 moves from a horizontal orientation to a non-horizontal orientation.

To lower support structure 20, the direction of motor 51 is reversed, thereby driving lift assemblies 60 in the opposite direction and lowering support structure 20 for use. As shown in FIG. 3, when support structure 20 is in its lowermost orientation, projections 83 engage stop members 72 to provide a positive stop. The interaction of stop members 72 and projections 83 provides additional support and rigidity to the bed structure when it is deployed in the sleeping position.

Figure 7:
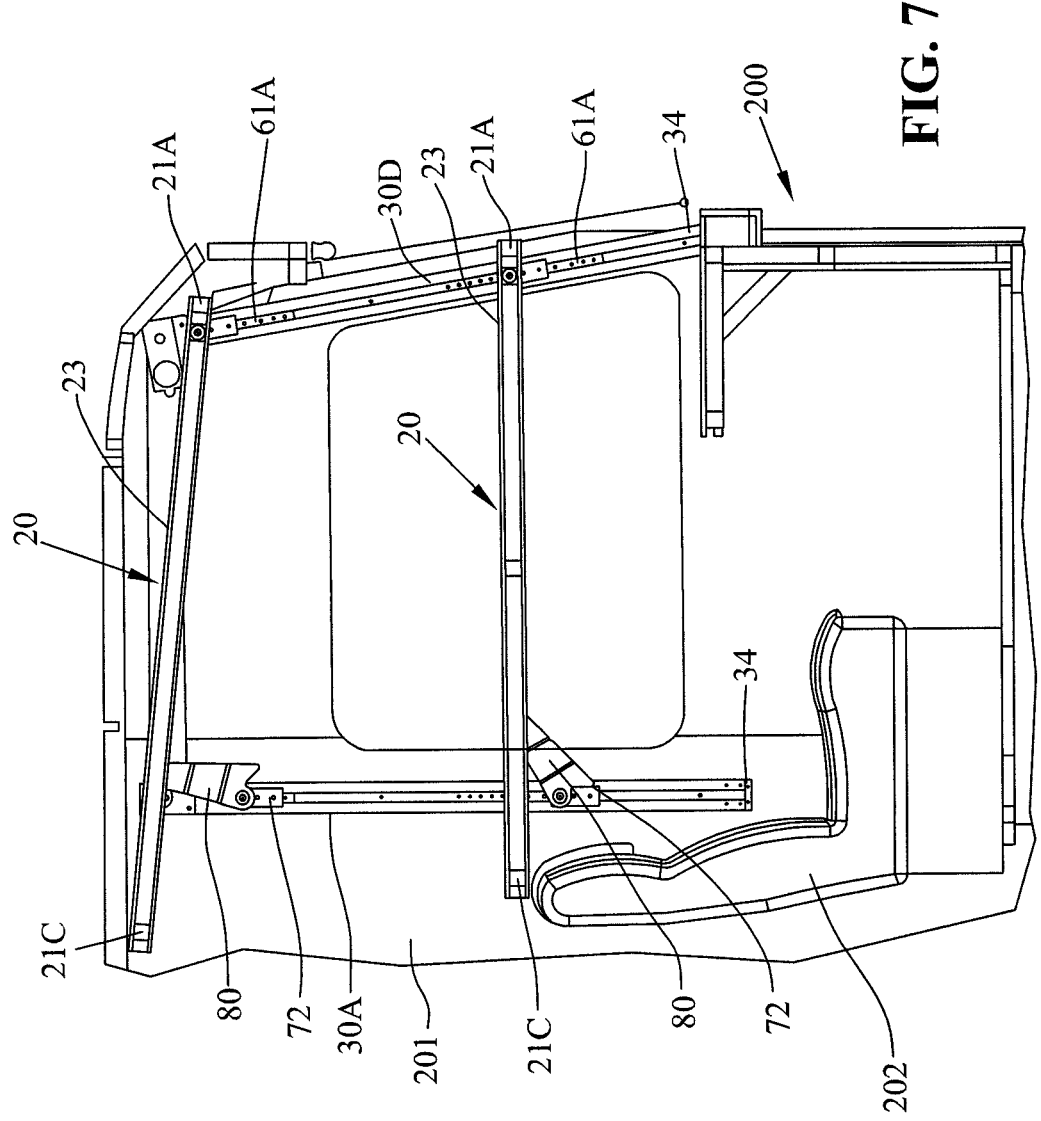
FIG. 7 is a partial sectional view of the moveable bed system of FIG. 1 installed in a recreational vehicle.

FIG. 7 is a partial sectional view of the system of FIG. 1 installed in a recreational vehicle 200. FIG. 7 shows the support structure 20 in both the lowered and raised positions. As shown in FIG. 7, guide 30A is secured to an interior wall 201 of the recreational vehicle in a substantially vertical orientation. Guide 30B is installed on the opposite interior wall in the same fashion. Guide 30D is installed on interior wall 201 and, in the embodiment shown, is angled in such a manner as to generally be oriented along the A-pillar of the vehicle 200. Guide 30C is installed on the opposite wall in the same manner. In the embodiment shown, system 10 is installed such that when support structure 20 is in the lowered, substantially horizontal position, it rests just above seat 202. When support structure 20 is in the raised, stored position, frame member 21C is located higher than frame member 21A. This provides more head room for occupants of the vehicle adjacent that end of support structure 20 than if frame member 21C were at the same height as 21A or lower.

Although the present invention has been shown and described in detail, the same is to be taken by way of example only and not by way of limitation. Numerous modifications can be made to the embodiments disclosed herein without departing from the spirit and scope of the invention. For example, the present invention is not limited to the particular drive system 50 and lift assemblies 60 shown and described. A number of appropriate drive systems are known to those of skill in the art, including drive systems that utilize cables and pulleys or rack and pinion type mechanisms.

What is claimed is:

1. A bed system, including:
    a support having a first surface, the support being moveable from a lower horizontal position in which the first surface faces upward to an upper-most non-horizontal position in which the first surface faces upward;
    a plurality of guides including at least a first guide and a second guide;
    a first lift assembly located in the first guide and moveable with respect to the first guide and a second lift assembly located in the second guide and moveable with respect to the second guide, each of the first and second lift assemblies being coupled to the support; and
    a drive system for moving the first and second lift assemblies from the lower position to the upper-most position, the drive system including a motor;
    wherein the first guide includes a channel having an open side and the second guide includes a channel having an open side facing and opposite the open side of the channel of the first guide, wherein the first and second guides are substantially parallel and the support is located between the first and second guides and wherein the first and second guides each have first and second ends, the support being located proximate the first ends in the lower position and the support being located proximate the second ends in the upper-most position.

2. The bed system of claim 1, further including at least one link pivotally coupled to the support and pivotally coupled to one of the lift assemblies.

3. The bed system of claim 2, further including a stop member and wherein the at least one link engages the stop member when the support is in the lower horizontal position.

4. The bed system of claim 1, wherein at least one of the lift assemblies includes a projection that engages a portion of the drive system.

5. The bed system of claim 1, further including a third guide oriented at an angle to the first guide and a fourth guide opposite the third guide and oriented at an angle to the second guide.

6. A recreational vehicle including the bed system of claim 1.

7. A bed system, including:
    a support moveable from a lower horizontal position to a raised non-horizontal position;
    a plurality of guides including at least a first guide having a channel and a second guide having a channel facing and opposite the first guide, wherein the first and second guides are substantially parallel and the support is located between the first and second guides and wherein the first and second guides each have first and second ends, the support being located proximate the first ends in the lower position and the support being located proximate the second ends in the raised position;
    a first lift assembly located in the first guide and moveable with respect to the first guide and a second lift assembly located in the second guide and moveable with respect to the second guide, each of the first and second lift assemblies being coupled to the support;
    a drive system for moving the first and second lift assemblies from the lower position to the raised position, the drive system including a motor; and
    at least one link pivotally coupled to the support and pivotally coupled to one of the lift assemblies.

8. The bed system of claim 7, further including a stop member and wherein the at least one link engages the stop member when the support is in the lower horizontal position.

9. The bed system of claim 7, wherein at least one of the lift assemblies includes a projection that engages a portion of the drive system.

10. A recreational vehicle including the bed system of claim 7.

11. The bed system of claim 7, further including a third guide oriented at an angle to the first guide and a fourth guide opposite the third guide and oriented at an angle to the second guide.

12. A bed system, including:
    a support moveable from a lower horizontal position to a raised non-horizontal position;
    a plurality of guides including at least a first vertically oriented guide having a channel and a second guide having a channel facing and opposite the first guide, wherein the first and second guides are substantially parallel and the support is located between the first and second guides and wherein the first and second guides each have first and second ends, the support being located proximate the first ends in the lower position and the support being located proximate the second ends in the raised position;
    a first lift assembly located in the first guide and moveable with respect to the first guide and a second lift assembly located in the second guide and moveable with respect to the second guide, each of the first and second lift assemblies being coupled to the support; and
    a drive system for moving the first and second lift assemblies from the lower position to the raised position, the drive system including a motor.

13. The bed system of claim 12, further including at least one link pivotally coupled to the support and pivotally coupled to one of the lift assemblies.

14. The bed system of claim 13, further including a stop member and wherein the at least one link engages the stop member when the support is in the lower horizontal position.

15. The bed system of claim 12, wherein at least one of the lift assemblies includes a projection that engages a portion of the drive system.

16. A recreational vehicle including the bed system of claim 12.

* * * * *